(12) United States Patent
Pan et al.

(10) Patent No.: US 7,290,919 B2
(45) Date of Patent: Nov. 6, 2007

(54) BACKLIGHT MODULE AND BRIGHTNESS ENHANCEMENT FILM THEREOF

(75) Inventors: Cheng-tang Pan, Sigang Township, Tainan County (TW); Ching-hua Su, Dali (TW); Han-chang Cheng, Fongshan (TW); Chih-liang Pan, Taipei (TW)

(73) Assignees: AU Optronics Corp., Hsin-Chu (TW); Sun Yat-senUniversity, Kaohsiung (TW)

( * ) Notice: Subject to any disclaimer, the term of this patent is extended or adjusted under 35 U.S.C. 154(b) by 0 days.

(21) Appl. No.: 11/409,302

(22) Filed: Apr. 21, 2006

(65) Prior Publication Data

US 2007/0121339 A1 May 31, 2007

(30) Foreign Application Priority Data

Nov. 25, 2005 (TW) ............................. 94141606 A (51) Int. Cl.
*F21V 7/04* (2006.01)
(52) U.S. Cl. ...................... 362/618; 362/606; 362/609; 362/615; 362/619; 362/620; 362/621
(58) Field of Classification Search ................ 362/606, 362/609, 615, 618, 619–621
See application file for complete search history.

(56) References Cited

U.S. PATENT DOCUMENTS

| 5,598,280 | A | * | 1/1997 | Nishio et al. ................. 349/57 |
| 6,231,200 | B1 | * | 5/2001 | Shinohara et al. .......... 362/619 |
| 6,827,460 | B2 | * | 12/2004 | Higuchi ...................... 362/609 |
| 2001/0019378 | A1 | | 9/2001 | Yamaguchi |
| 2003/0184993 | A1 | * | 10/2003 | Yamada ........................ 362/31 |
| 2003/0223216 | A1 | * | 12/2003 | Emmons et al. .............. 362/31 |
| 2005/0185115 | A1 | | 8/2005 | Yee et al. |
| 2006/0072342 | A1 | * | 4/2006 | Kim et al. ................... 362/620 |

FOREIGN PATENT DOCUMENTS

CN    1661439    8/2005

* cited by examiner

*Primary Examiner*—Stephen F. Husar
*Assistant Examiner*—Meghan K. Dunwiddie (57) ABSTRACT

A backlight module includes a light source, a light guide plate for guiding light from the light source, and a brightness enhancement film having a plurality of spherical surface microlenses for gathering light from the light guide plate. In contrast to traditional prism sheets, the brightness enhancement film having the plurality of spherical surface microlenses have better efficiency of light-gathering.

19 Claims, 9 Drawing Sheets

BACKLIGHT MODULE AND BRIGHTNESS ENHANCEMENT FILM THEREOF

BACKGROUND OF THE INVENTION

1. Field of the Invention

The present invention relates to a backlight module used in a liquid crystal display, and more particularly, to a backlight module with a brightness enhancement film having a plurality of spherical surface microlenses.

2. Description of the Related Art

A backlight module is a key component of a liquid crystal display (LCD). The purpose of the backlight module is to provide a sufficient-brightness and an even-distribution light surface to the LCD panel. Because the LCD is widely used in various electronic products such as a monitor, a notebook computer, a digital camera, and a projector, the demand for the backlight module has increased tremendously.

Figure 1:
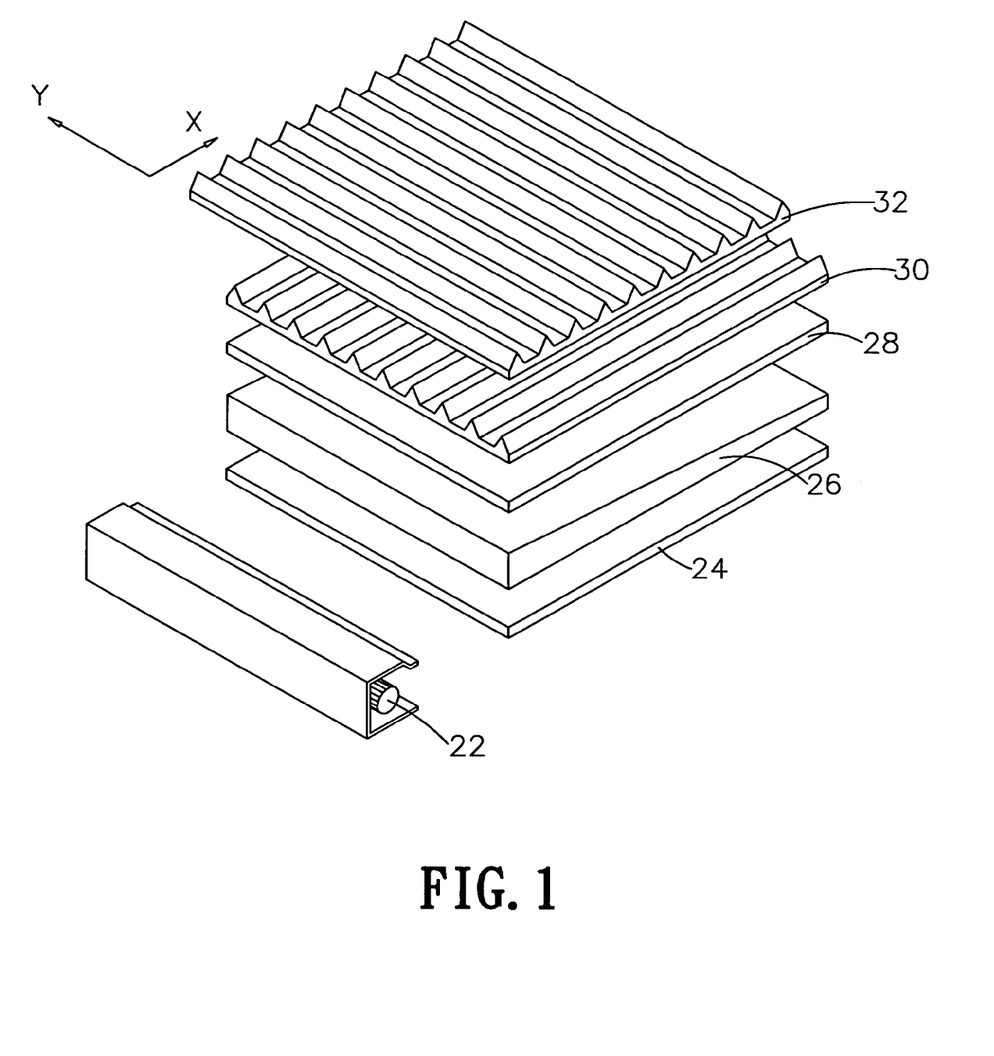
FIG. 1 shows a conventional backlight module.

Please refer to FIG. 1, which shows a prior art of a backlight module 20. The backlight module 20 comprises a light source 22 (such as a cold cathode fluorescent lamp, a hot cathode fluorescent lamp, a light emitting diode), a light guide plate 26, a reflector 24 disposed at a side of the light guide plate 26, a diffusion sheet 28, and prism sheets 30 and 32. The reflector 24 is used for reflecting light from the light source 22 toward the light guide plate 26. Then the light guide plate 26 guides light emitted from the light source 22 and light reflected from the reflector 24 as uniform planar light. Through the light-distributing of the diffusion sheet 28 and light-gathering of the prism sheets 30 and 32, the light is fed into an LCD panel. The prism sheets 30 and 32 are formed by hardening an acrylic resin on a polyester film with a thickness of 125-μm by means of exposure under high energy UV light. The conventional prism sheets 30 and 32 are served as bar-alignment triangle prisms in characteristics of a vertex angle of substantial 90 degrees with an interval of 50 μm within each other. The prism sheets 30 and 32 can concentrate scatter light from the light guide plate 26 upward with substantial ±35 degrees with respect to a direction of an on-axis. Nevertheless, as shown in FIG. 1, the prism sheet 30 only concentrate light constituent of Y-axis upward, and the prism sheet 32 only concentrate light constituent of X-axis upward. Therefore, utilizing only a single prism sheet can enhance the brightness by 1.6 times, while, for better light-gathering quality, utilizing two prism sheets 30 and 32 with their prism alignments thereon being vertical to each other can enhance the brightness by 2 times or more. In other words, scatter light is gathered by means of prisms on the prism sheets 30 and 32, therefore boosting the brightness of the LCD display by 2 times. In this manner, for the LCD display described above, power consumption is lowered and a life span of batteries is lengthened.

Consequently, using a single prism sheet fails to provide sufficient brightness, while using two prism sheets may result in more photo-energy consumption. Besides, using two prism sheets may induce higher cost for the backlight module as a result.

SUMMARY OF THE INVENTION

An objective of the present invention is to provide a backlight module comprising a brightness enhancement film with a plurality of spherical surface microlenses in lieu of a backlight module having two conventional prism sheets to solve the problem existing in prior art.

Briefly summarized, the invention provides a backlight module comprising a light source, a light guide plate for guiding light from the light source, and a brightness enhancement film comprising a plurality of spherical surface microlenses for gathering light from the light guide plate.

It is an advantage of the present invention that using one brightness enhancement film with a plurality of spherical surface microlenses thereon in lieu of the conventional structure of two prism sheets. The scatter light from the light guide plate can be concentrated toward a direction of an on-axis by the spherical surface microlenses, solving the conventional defect of needing to use two prism sheets to concentrate light.

The disclosed inventions will be described with references to the accompanying drawings, which show important example embodiments of the inventions and are incorporated in the specification hereof by related references.

DETAILED DESCRIPTION OF THE PREFERRED EMBODIMENT

Figure 2:
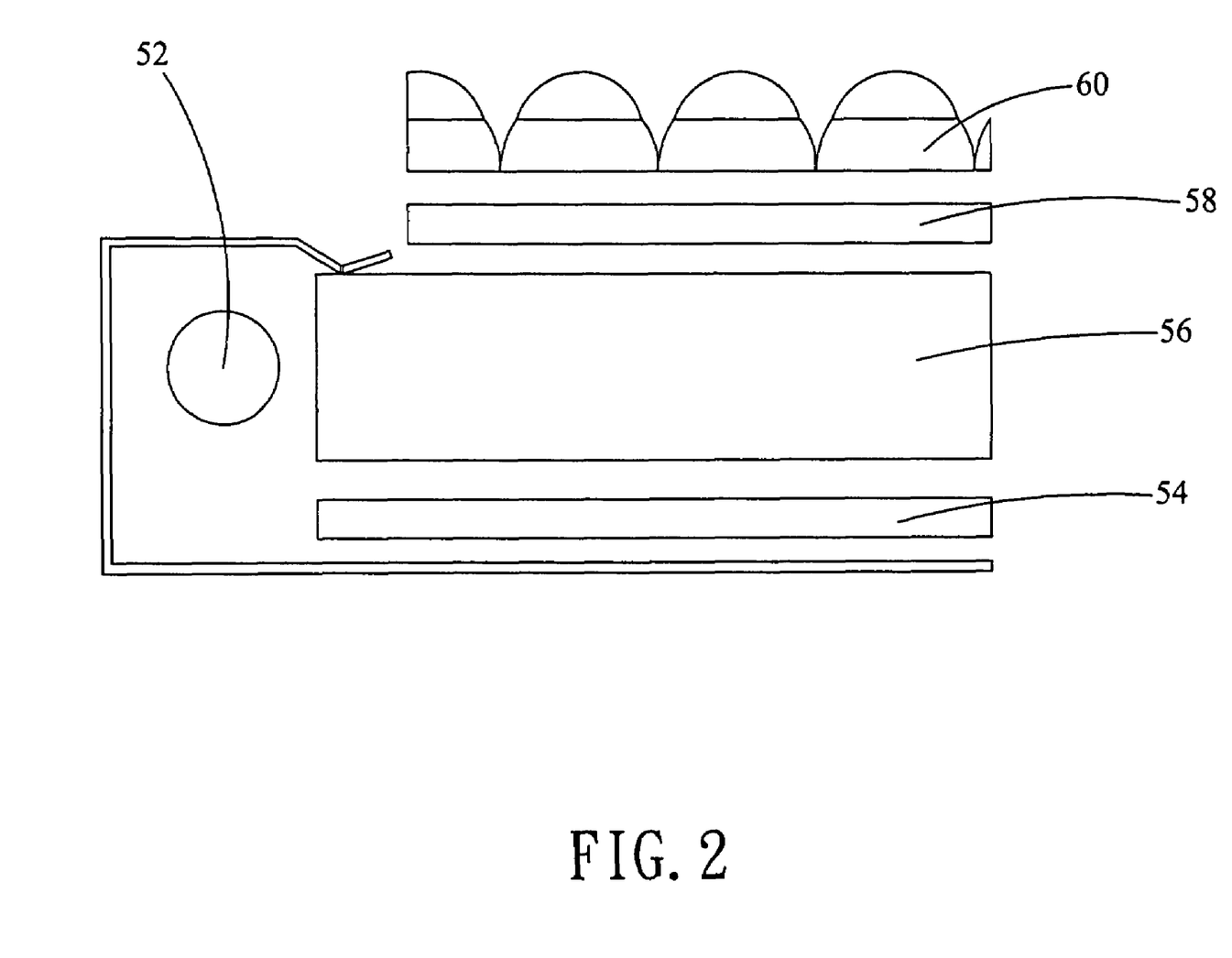
FIG. 2 shows a backlight module according to an embodiment of the present invention.

Please refer to FIG. 2, which shows a backlight module 50 in accordance with the present invention. The backlight module 50 comprises a light source 52 (such as a cold cathode fluorescent lamp, a hot cathode fluorescent lamp, a light emitting diode), a light guide plate 56, a reflector 54 disposed at a side of the light guide plate 56, and a brightness enhancement film 60. The reflector 54 is used for reflecting light from the light source 52 toward the light guide plate 56. The light guide plate 56 guides light emitted from the light source 52 and light reflected from the reflector 54 and distributes the light as a uniform planar light source. Through the light-distributing of the diffusion sheet 58 and light-gathering of the brightness enhancement film 60, the light is fed into an LCD panel. In FIG. 2, the diffusion sheet 58 is preferably disposed between the brightness enhancement film 60 and the light guild plate 56. In other embodiments, either disposing the diffusion sheet 58 over the brightness enhancement film 60, or no diffusion sheet arrangement is also allowed.

Figure 3:
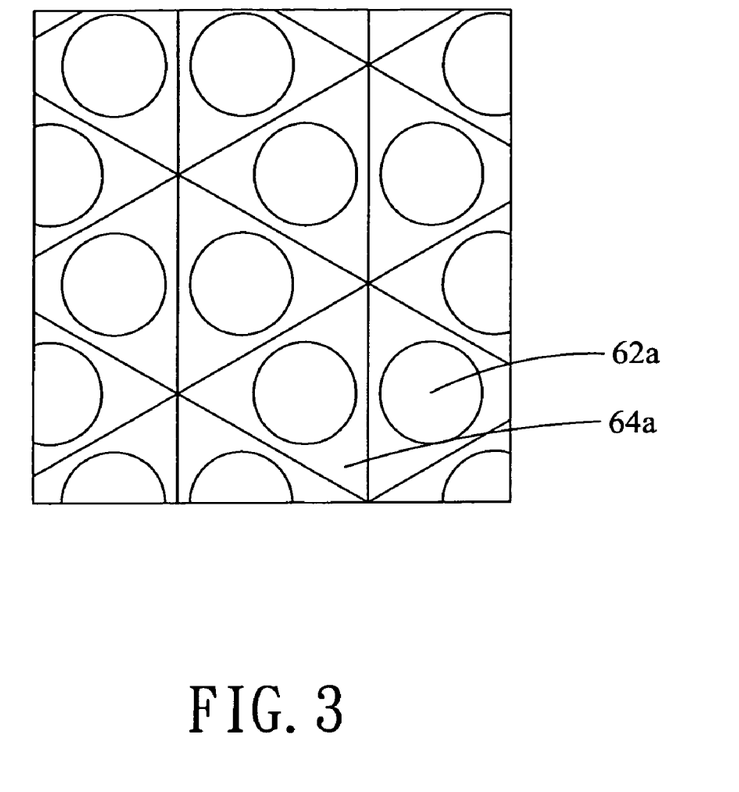
FIG. 3 is an enlarged view of a first embodiment of the brightness enhancement film depicted in FIG. 2.
Figure 4:
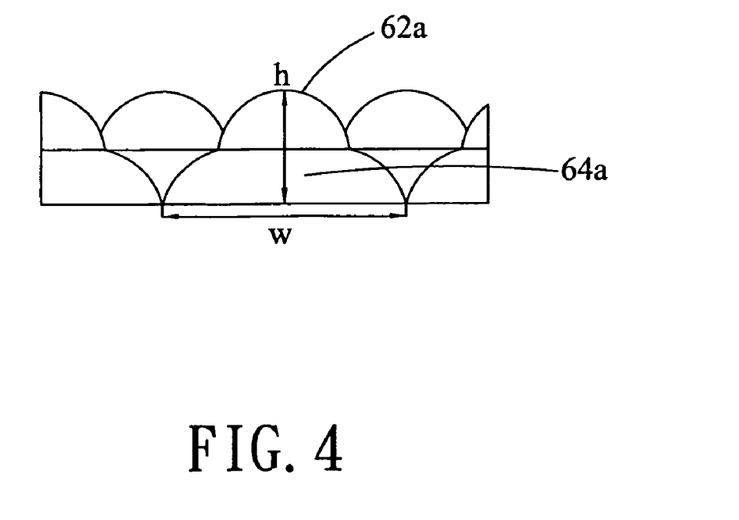
FIG. 4 is a side view of the first embodiment of the brightness enhancement film depicted in FIG. 2.

Please refer to FIG. 3 to FIG. 8. FIG. 3 and FIG. 4, respectively, are an enlarged view and a side view of a first embodiment of the brightness enhancement film 60 depicted in FIG. 2. The brightness enhancement film 60 comprises a plurality of spherical surface microlenses 62a and a plurality of carriers 64a. Each spherical surface microlens 62a is disposed on corresponding one of the plurality of carriers 64a. Each of the plurality of carriers 64a is closely disposed with each other. The plurality of carriers 64a are substantially shaped as triangles.

Figure 5:
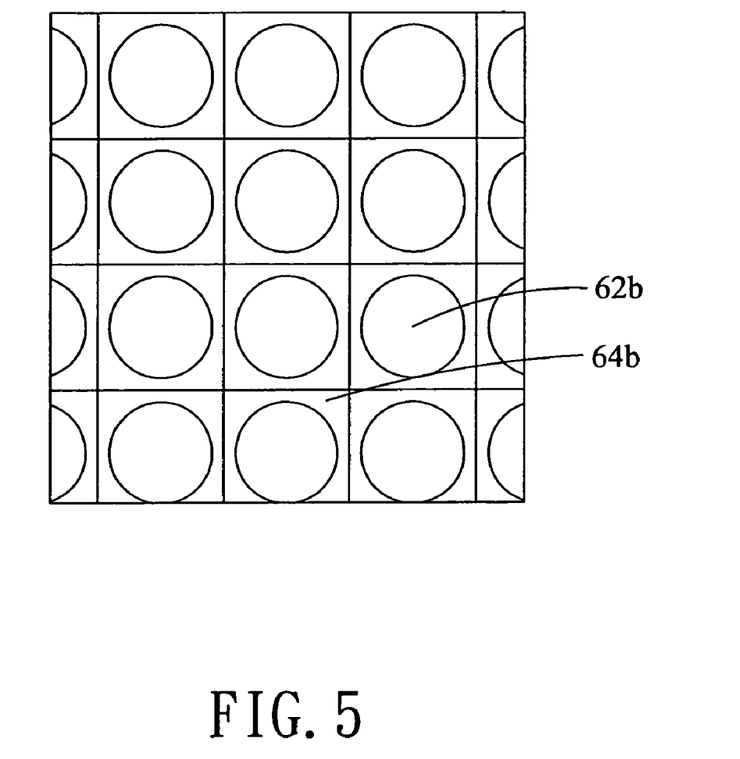
FIG. 5 is an enlarged view of a second embodiment of the brightness enhancement film depicted in FIG. 2.
Figure 6:
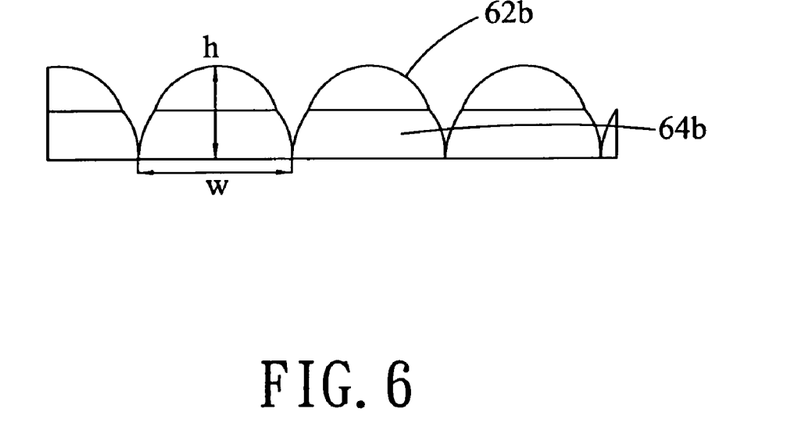
FIG. 6 is a side view of the second embodiment of the brightness enhancement film depicted in FIG. 2.

FIG. 5 and FIG. 6, respectively, are an enlarged view and a side view of a second embodiment of the brightness enhancement film 60 depicted in FIG. 2. The brightness enhancement film 60 comprises a plurality of spherical surface microlenses 62b and a plurality of carriers 64b. Each spherical surface microlens 62b is disposed on corresponding one of the plurality of carriers 64b. Each of the plurality of carriers 64b is closely disposed with each other. The plurality of carriers 64b are substantially shaped as rectangles.

Figure 7:
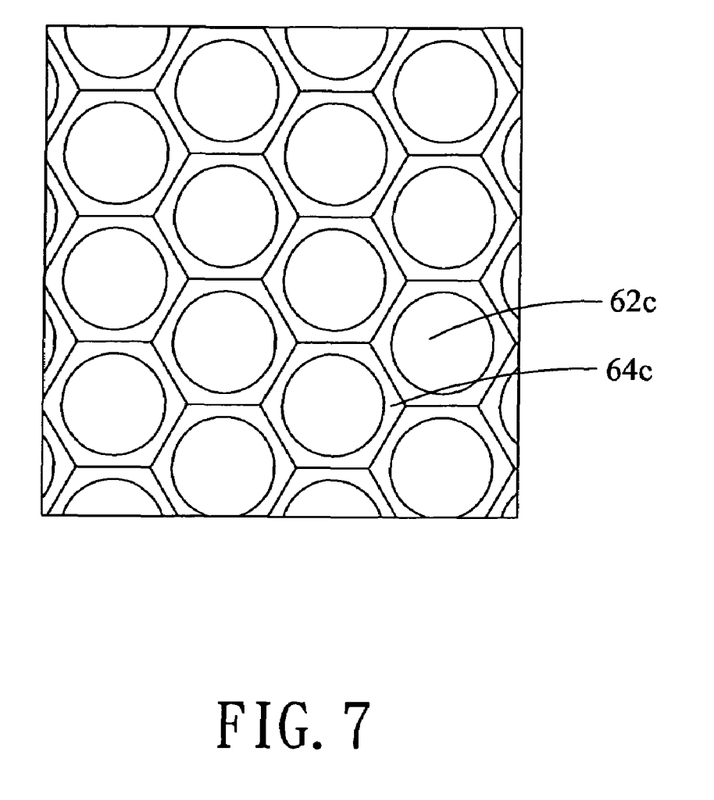
FIG. 7 is an enlarged view of a third embodiment of the brightness enhancement film depicted in FIG. 2.
Figure 8:
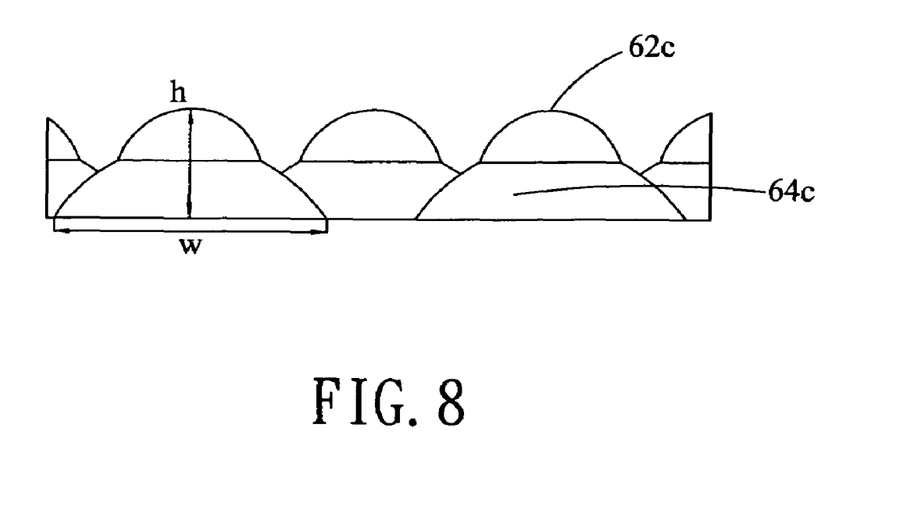
FIG. 8 is a side view of the third embodiment of the brightness enhancement film depicted in FIG. 2.

FIG. 7 and FIG. 8, respectively, are an enlarged view and a side view of a third embodiment of the brightness enhancement film 60 depicted in FIG. 2. The brightness enhancement film 60 comprises a plurality of spherical surface microlenses 62c and a plurality of carriers 64c. Each spherical surface microlen 62c is disposed on corresponding one of the plurality of carriers 64c. Each of the plurality of carriers 64c is closely disposed with each other. The plurality of carriers 64c are substantially shaped as hexagons.

A resolution for better light-gathering performance is to increase a thickness of the carriers 64a, 64b or 64c, or cushioning the carriers 64a, 64b or 64c with another carrier to obtain a higher ratio of height and width (h/w) of the brightness enhancement film 60.

Figure 9:
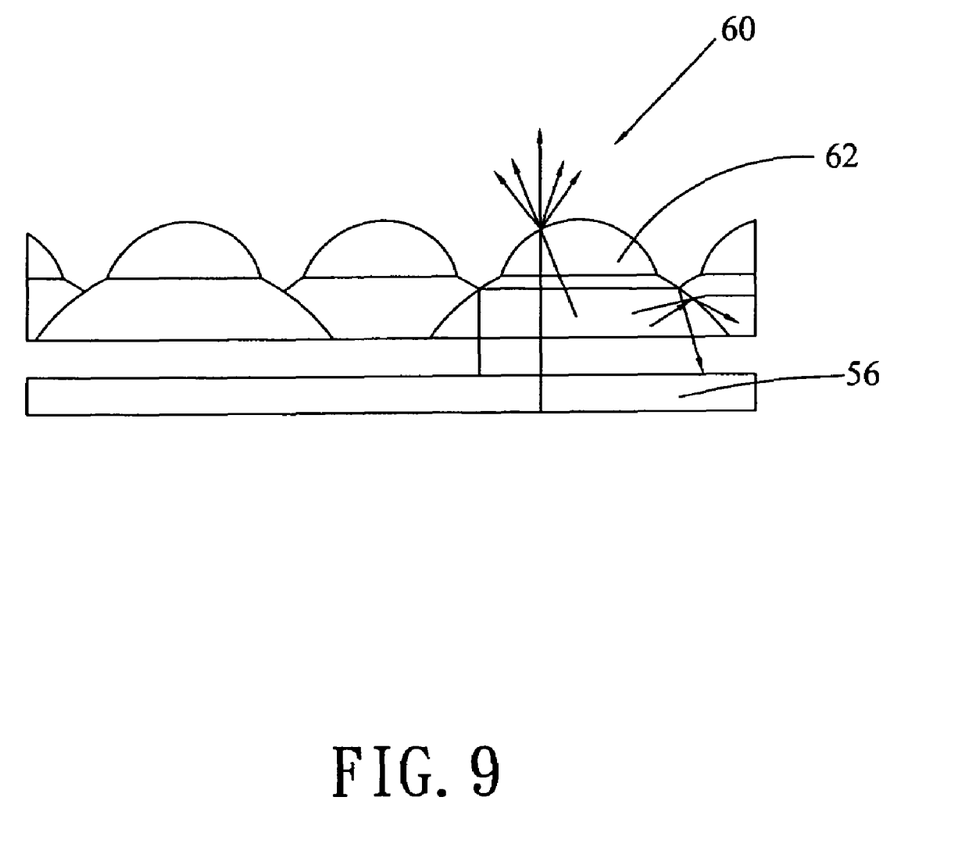
FIG. 9 is a schematic illustration showing light passing through a brightness enhancement film and a light guide plate.

Referring to FIG. 9, the spherical surface microlenses 62 can refract any light constituents from the light guide plate 56 upward.

Figure 10A:
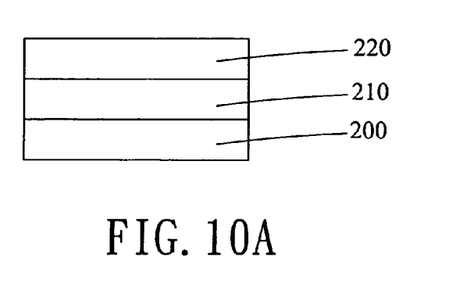
FIGS. 10A-10I illustrate a flow forming the brightness enhancement film according to the present invention.
Figure 10B:
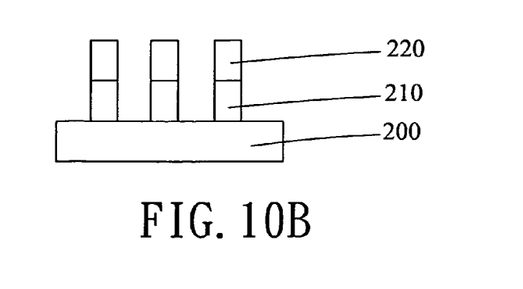
Figure 10C:
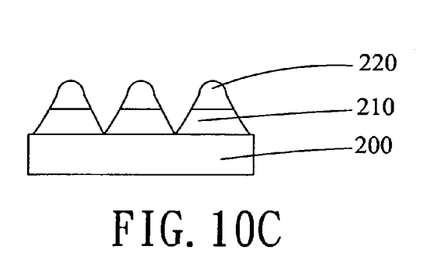
Figure 10D:
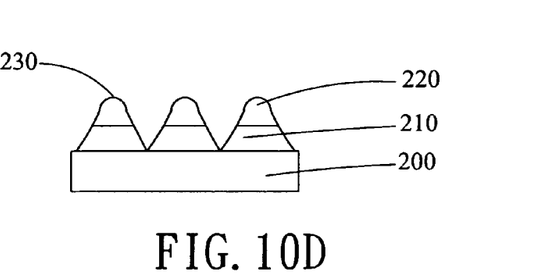

Please refer to FIGS. 10A-10I, which illustrate a flow of forming the brightness enhancement film according to the present invention. First of all, as shown in FIG. 10A, a first photoresist 210 (e.g. Az9260) is spread on a substrate 200 in a spin-coating manner. Next, a second photoresist 220 (e.g. AZ4620) is also spread evenly on the first photoresist 210 in a spin-coating manner. It is appreciated that melting point of the first photoresist 210 should be higher than that of the second photoresist 220. Then, as shown in FIG. 10B, etching the first photoresist 210 and the second photoresist 220 are performed to form an array pattern. As can be seen in FIG. 10C, in a process of reflowing the first photoresist 210 and the second photoresist 220, due to the fact that the melting point of the first photoresist 210 is higher than that of the second photoresist 220, it happens that the first photoresist 210 is not completely melted but the second photoresist 220 has already melted. In doing so, the melted second photoresist 220 forms a half-sphere due to surface tension as the first photoresist 210 does not melt completely. As shown in FIG. 10D, sputtering a nickel film 230 on the first photoresist 210 and the second photoresist 220 is executed after cooling the photoresists 210 and 220.

Figure 10E:
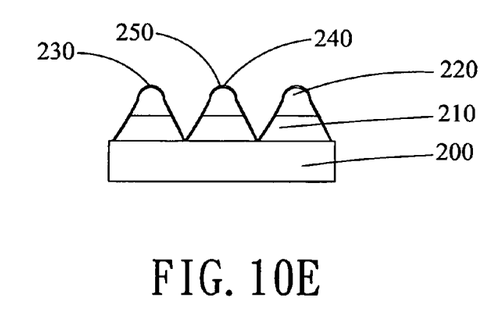
Figure 10F:
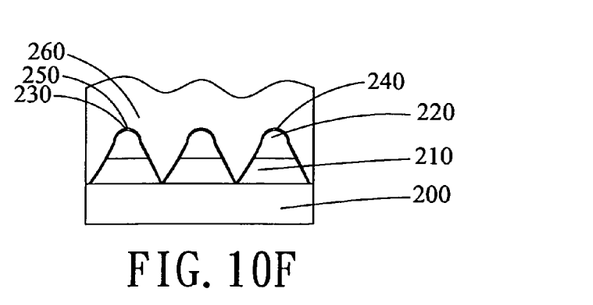
Figure 10G:
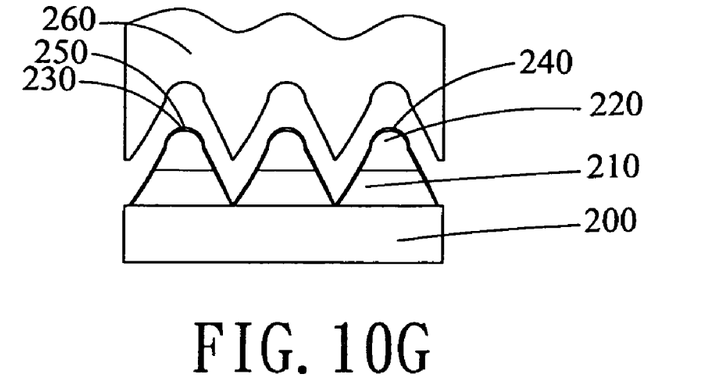
Figure 10H:
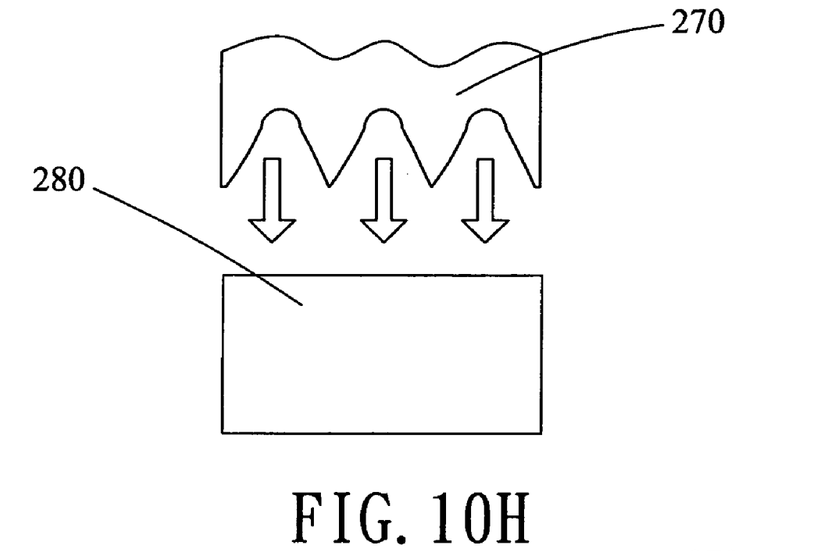
Figure 10I:
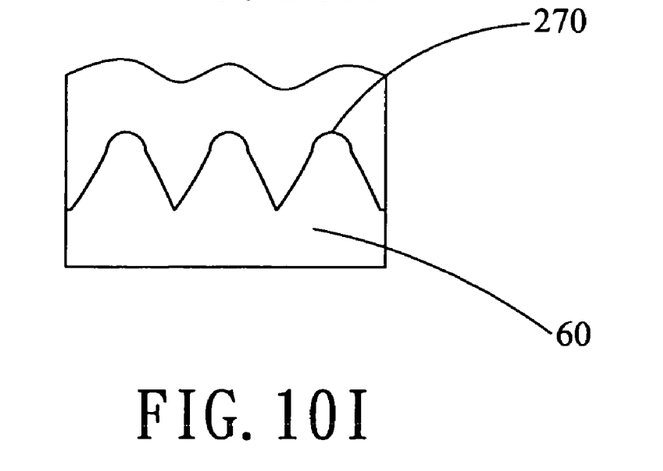

Next, electroplating a Ni—Co film 240 on the nickel film 230 and sputtering an Au film 250 on the Ni—Co film 240 are illustrated in FIG. 10E. Furthermore, the first photoresist 210 and the second photoresist 220, covering with metal films 230, 240, 250, are electroformed to form a cast 260, as shown in FIGS. 10F and 10G Finally, a metal mold 270 is obtained by re-electroforming the cast 260. Accordingly, a mass production of the brightness enhancement film 60 with a plurality of spherical surface microlenses is possible by injecting plastic material 280 such as polyester or polycarbonate into the metal mold 270, as shown in FIGS. 10H and 10I.

Figure 11:
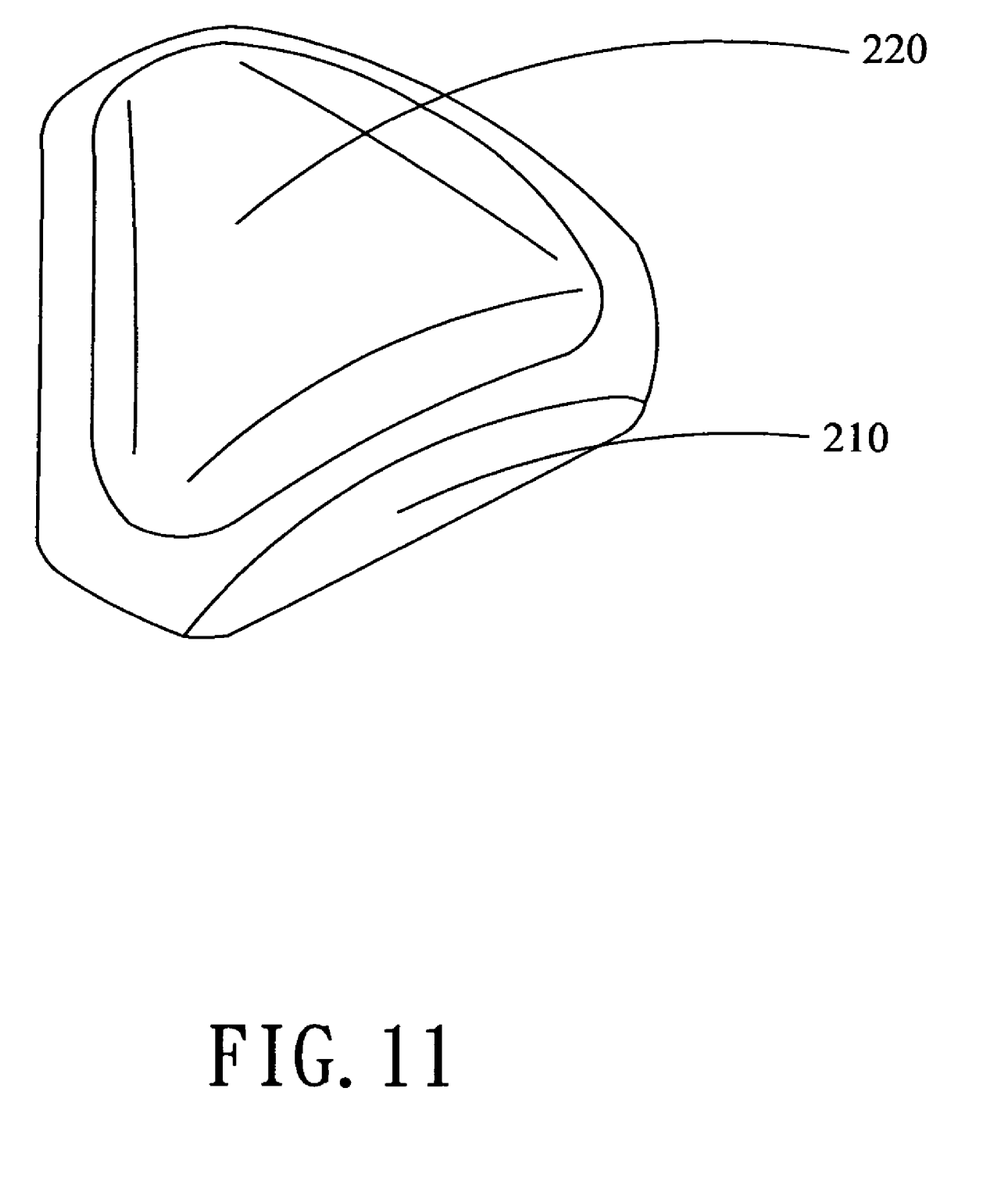
FIG. 11 shows an appearance of the first photoresist and the second photoresist to be heated after a period of time.

Preferably, spherical surface microlens 62a, 62b, and 62c are substantially shaped as spheres. However, in real process of forming the metal mold 270, the appearance of the melted second photoresist 220, due to incomplete melt of the first photoresist 210, is as shown in FIG. 11, rather than a half-sphere. As a result, the appearance of the spherical surface microlenses of the brightness enhancement film 60 made by the metal mold 270 is similar to the appearance shown in FIG. 11.

In contrast to prior art, the present inventive backlight module uses a brightness enhancement film with a plurality of spherical surface microlenses thereon in lieu of the conventional structure of two prism sheets. The scatter light from the light guide plate can be concentrated toward a direction of an on-axis by the spherical surface microlenses, solving the defect of the use of two prism sheets. In addition, the present inventive brightness enhancement film has the function of light-gathering and light-distributing. Since the light only passes through a single brightness enhancement film, photo energy consumption is reduced. Therefore, the use of the present inventive brightness enhancement film not only lowers costs, but also reduces power consumption.

The present invention has been described with references to certain preferred and alternative embodiments which are intended to be exemplary only and not limiting to the full scope of the present invention as set forth in the appended claims.

What is claimed is:

1. A backlight module, comprising:
   a light source;
   a light guide plate for guiding light from the light source; and
   a brightness enhancement film, having a plurality of spherical surface microlenses and a plurality of carriers formed thereon, disposed over the light guide plate, wherein each of the spherical surface microlenses is disposed on the corresponding one of the plurality of carriers, thereby increasing a height-wide ratio of the brightness enhancement film.

2. The backlight module of claim 1, further comprising a reflector for reflecting light from the light source.

3. The backlight module of claim 1, wherein the plurality of carriers are substantially shaped as triangles, rectangles or hexagons.

4. The backlight module of claim 1, wherein each of the plurality of carriers is closely disposed with each other.

5. The backlight module of claim 1, further comprising a diffuser disposed between the light guide plate and the brightness enhancement film.

6. The backlight module of claim 1, further comprising a diffuser disposed over the brightness enhancement film.

7. The backlight module of claim 1, wherein the plurality of microlenses are made of polyester or polycarbonate.

8. A liquid crystal display comprising the backlight module of claim 1.

9. A brightness enhancement film, comprising:
   a substrate;
   a plurality of first carriers disposed on the substrate; and
   a plurality of spherical surface microlenses, each being disposed on the corresponding one of the plurality of first carriers.

10. The brightness enhancement film of claim 9, wherein the plurality of first carriers are substantially shaped as triangles, rectangles or hexagons.

11. The brightness enhancement film of claim 9, wherein each of the plurality of first carriers is closely disposed with each other.

12. The brightness enhancement film of claim 9, wherein the plurality of microlenses are made of polyester or polycarbonate.

13. The brightness enhancement film of claim 9, further comprising a plurality of second carriers, wherein the plurality of first carriers are disposed on the plurality of second carriers, thereby increasing a height-wide ratio of the brightness enhancement film.

14. A backlight module, comprising:
 a light source;
  a light guide plate for guiding light from the light source; and
  a brightness enhancement film, having a plurality of spherical surface microlenses and a plurality of carriers formed thereon, disposed over the light guide plate, wherein each of the plurality of carriers is closely disposed with each other, and each of the spherical surface microlenses is disposed on the corresponding one of the plurality of carriers.

15. The backlight module of claim 14, further comprising a reflector for reflecting light from the light source.

16. The backlight module of claim 14, wherein the plurality of carriers are substantially shaped as triangles, rectangles or hexagons.

17. The backlight module of claim 14, further comprising a diffuser disposed between the light guide plate and the brightness enhancement film.

18. The backlight module of claim 14, further comprising a diffuser disposed over the brightness enhancement film.

19. The backlight module of claim 14, wherein the plurality of microlenses are made of polyester or polycarbonate material.

* * * * *